United States Patent
Tanai et al.

[11] Patent Number: 5,886,584
[45] Date of Patent: Mar. 23, 1999

[54] METHOD AND APPARATUS FOR ADJUSTING MODULATION ACCURACY OF AN ORTHOGONAL MODULATION

[75] Inventors: Masaharu Tanai; Masayasu Sugimori, both of Tokyo, Japan

[73] Assignee: Ando Electric Co., Ltd., Tokyo, Japan

[21] Appl. No.: 856,209

[22] Filed: May 14, 1997

[30] Foreign Application Priority Data

May 31, 1996 [JP] Japan .................................. 8-160976

[51] Int. Cl.$^6$ .................................................. H04L 27/36
[52] U.S. Cl. .......................... 332/103; 375/296; 375/298
[58] Field of Search .................................. 332/103, 104, 332/105; 375/298, 308, 296

[56] References Cited

U.S. PATENT DOCUMENTS 5,371,481 12/1994 Tiittanen et al. ....................... 332/103

Primary Examiner—Siegfried H. Grimm
Attorney, Agent, or Firm—Flynn, Thiel, Boutell & Tanis, P.C.

[57] ABSTRACT

A method of adjusting modulation accuracy corrects an I modulation signal and a Q modulation signal without using special hardware when an accurate 90° phase difference between the I modulation signal and the Q modulation signal is not present. The method comprises setting I component correction Δi for a plurality of phase differences in advance to an I component corrector in accordance with an I signal, which is converted from digital modulation data in a digital data train by a modulator and an IQ converter of a phase error corrector. The method also comprises setting a Q component correction Δq for a plurality of phase differences in advance to a Q component corrector in accordance with a Q signal, controlling the I component corrector and the Q component corrector by a phase error correction controller, thereby adding the I component correction Δi and the Q component correction Δq to the I signal and the Q signal so as to generate a corrected I signal and a corrected Q signal. Thus the phase difference between an I modulation signal and a Q modulation signal is accurately adjusted to 90°.

15 Claims, 4 Drawing Sheets

METHOD AND APPARATUS FOR ADJUSTING MODULATION ACCURACY OF AN ORTHOGONAL MODULATION

BACKGROUND OF THE INVENTION

1. Field of the Invention

The present invention relates to a method of adjusting a modulation accuracy whereby, in a digital modulator used in a mobile communication such as the PDC, PHC (personal handy phone system), and the like, the modulation accuracy deteriorated from a phase error of a local signal applied to an orthogonal modulator being a component of the digital modulator is corrected without using a special hardware, and an apparatus of the same.

2. Description of the Related Art

FIG. 4 is a block diagram showing a construction of a conventional digital modulator. In the conventional example shown in FIG. 4, the modulator employs the orthogonal modulation circuit to meet the digital mobile communication system using a modulation system such as the π/4 shift QPSK (quadriphase shift keying), GMS (Gaussian filtered minimum shift keying), or 16 QAM (quadrature amplitude modulation).

The digital modulator in FIG. 4 will now be described.

A modulation data 1A in a digital data train is a data to conform the signal format standardized by the communication system for the PDC, PHS, and the like, which is a digital data train expressed by the logic "1" and "0".

The modulation data 1A is converted into an I signal 1B and Q signal 1C through an IQ converter 12. The conversion rule to convert the modulation data 1A into the I signal 1B and Q signal 1C is determined in accordance with the modulation system such as the π/4 shift QPSK.

A modulating local signal 1D being a non-modulated sinewave, on the other hand, is multiplied by the foregoing I signal 1B in a multiplier 16 to produce an I modulation signal 1E, and is at the same time supplied to a phase converter 18 to produce a phase conversion signal 1G with a phase shifted by 90°. The phase conversion signal 1G is multiplied by the foregoing Q signal 1C in a multiplier 17 to produce a Q modulation signal 1F.

An adder 19 adds the I modulation signal 1E and the Q modulation signal 1F to produce a modulation signal 1H as an output from a modulator 20.

The multiplier 16, multiplier 17, phase converter 18, and adder 19 constitutes an orthogonal modulator 11.

And, for the modulating local signal 1D, a sinewave signal in a medium frequency range from 100 MHz to 200 MHz is generally used, and the modulation signal 1H is also a modulated signal in the same frequency range.

Incidentally, the phase conversion signal 1G is required to have the accurate 90° phase shift to the modulating local signal 1D. However in reality, due to dispersion of the circuit elements and wiling length of the phase converter 18, the accurate 90° phase difference is not necessarily secured and errors are included therein. And, if there is an error from 90° in the phase difference between the phase conversion signal 1G and the modulating local signal 1D, the error will deteriorate the modulation accuracy of the modulation signal 1H.

Next, the modulation accuracy will be described with reference to FIG. 5. For example, the π/4 shift QPSK modulation system determines four values ("00", "01", "11", "10") in accordance with phase shifts and transmits data. The modulation accuracy is expressed by the effective value of an error between vectors at a signal point. In FIG. 5, a vector error Δq between an ideal vector A and an actual vector B represents the modulation accuracy.

As described above, the phase conversion signal 1G in FIG. 4 does not necessarily hold the accurate 90° phase difference to the modulating local signal 1D due to dispersion of the circuit elements and wiling length.

Next, the influence on the modulation accuracy when the 90° phase difference is not obtained between the phase conversion signal 1G and the modulating local signal 1D will be described. When the accurate 90° phase difference is not obtained between the I modulation signal 1E and the Q modulation signal 1F, the Q axis is shifted to a Q1 axis and a component D on the Q axis is given by a component D1 on the Q1 axis as shown in FIG. 6.

Here, an error between an ideal vector A produced by the vector sum of the component D on the Q axis and a component E on the I axis and a vector C produced by the vector sum of the component D1 on the Q1 axis and the component E on the I axis will give a degradation on the modulation accuracy.

Consequently, in the orthogonal modulator for the digital signal, it is necessary to set the phase difference between the I modulation signal and the Q modulation signal accurately to 90°. In the conventional exercise, this phase difference is adjusted by means of a variable resistor or variable capacitor, which requires extra circuits and extra adjustment time.

SUMMARY OF THE INVENTION

According to a method of adjusting a modulation accuracy of the invention, a modulation data 1A is converted into an I signal 1B and a Q signal 1C in an IQ converter 12, and a phase error correction controller 15 controls an I component corrector 13 to produce a corrected I signal 1B1 by adding an I component correction Δi to the I signal 1B as well as controls a Q component corrector 14 to produce a corrected Q signal 1C1 by adding a Q component correction Δq to the Q signal 1C, whereby a phase difference between an I modulation signal 1E and a Q modulation signal 1F is corrected in the orthogonal modulator 11.

According to an apparatus of adjusting a modulation accuracy of the invention, a phase error corrector 10A is provided in which an I component correction Δi and a Q component correction Δq of a minute phase error to a plurality of phase differences are added to an I signal and a Q signal converted from a modulation data 1A, respectively, to produce a corrected I signal 1B1 and a corrected Q signal 1C1.

In an orthogonal modulator 11, the corrected I signal 1B1 is multiplied by a modulating local signal 1D to produce an I modulation signal 1E, and the corrected Q signal 1C is multiplied by a signal made by shifting the phase of the modulating local signal 1D by 90° to produce a Q modulation signal 1F. And, the I modulation signal 1E and the Q modulation signal 1F are added to produce a modulation signal 1H in which the phase difference between the I modulation signal 1E and the Q modulation signal 1F is corrected.

DESCRIPTION OF THE PREFERRED EMBODIMENTS

The first embodiment of a method of adjusting the modulation accuracy and an apparatus of the same according to the present invention will hereafter be described in detail with reference to the accompanying drawings.

Figure 1:
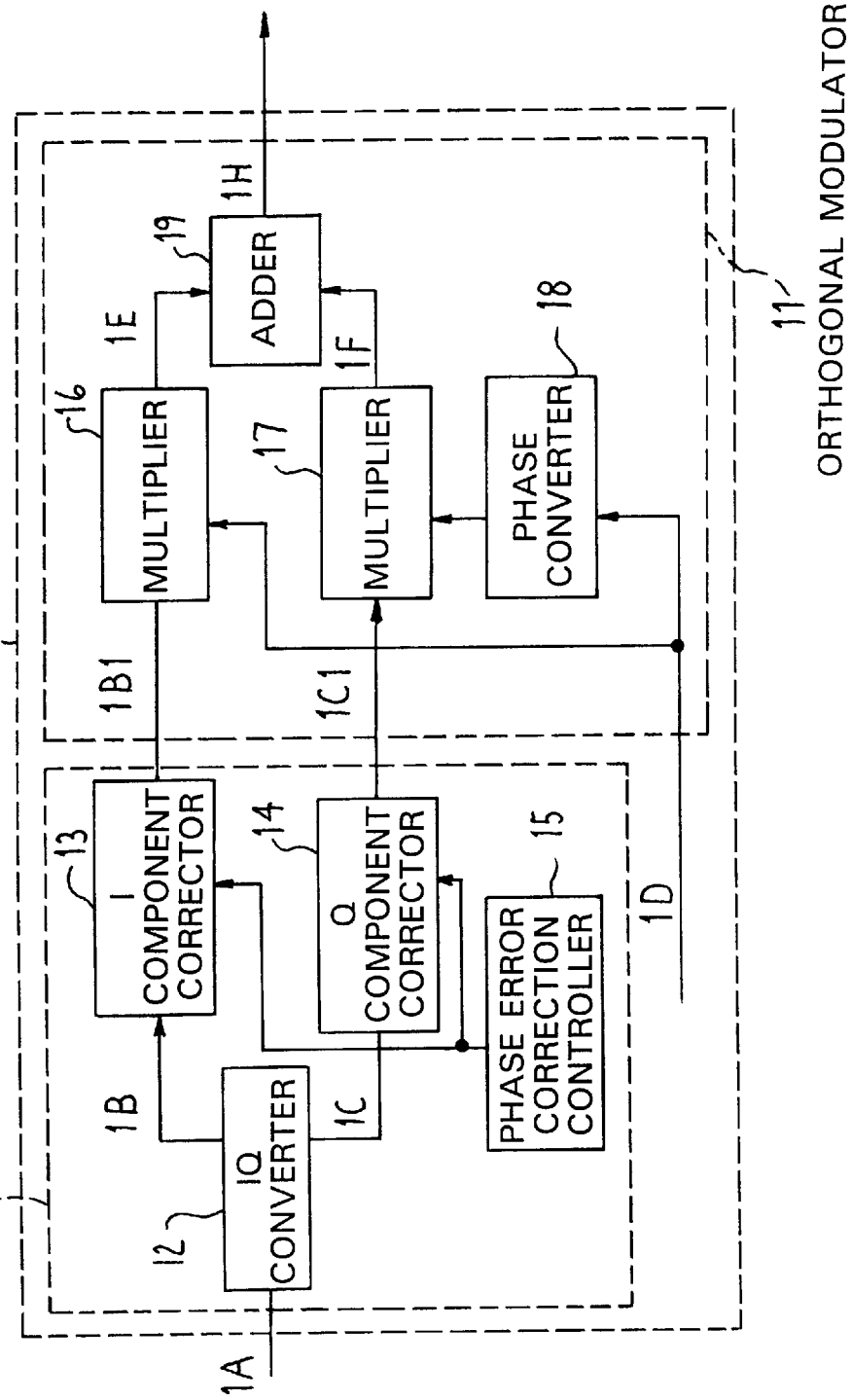
FIG. 1 is a block diagram showing a construction of a first embodiment of an apparatus of adjusting a modulation accuracy according to the present invention.

FIG. 1 is a block diagram showing a construction of an apparatus of adjusting the modulation accuracy, in which a method of adjusting the modulation accuracy of the first embodiment is applied. In FIG. 1, identical parts to the former FIG. 4 are given the identical references to avoid repetitive explanations, and different parts are described with a primary attention.

Figure 4:
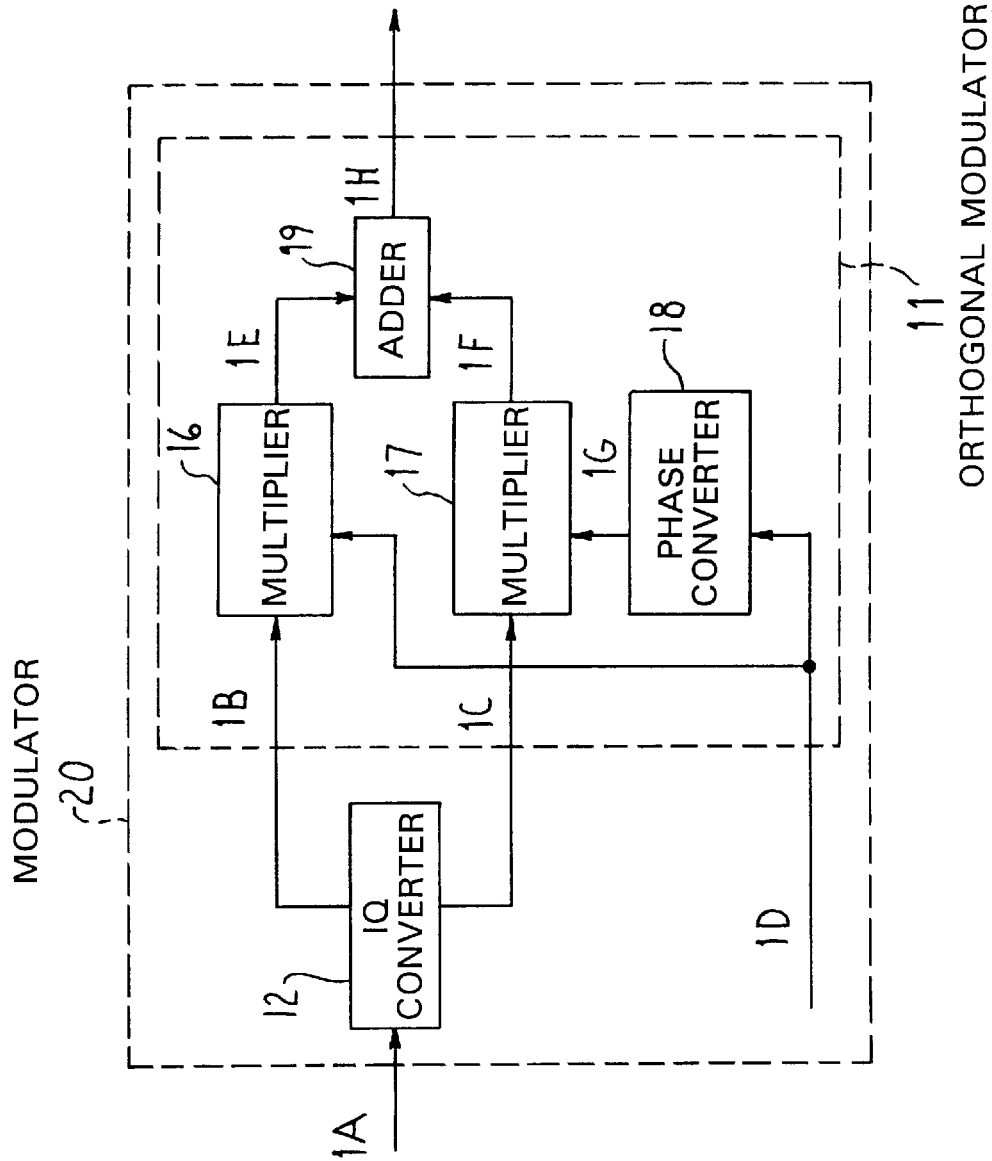
FIG. 4 a block diagram showing a construction of a conventional digital modulator, for explaining a conventional method of adjusting the modulation accuracy.
Figure 5:
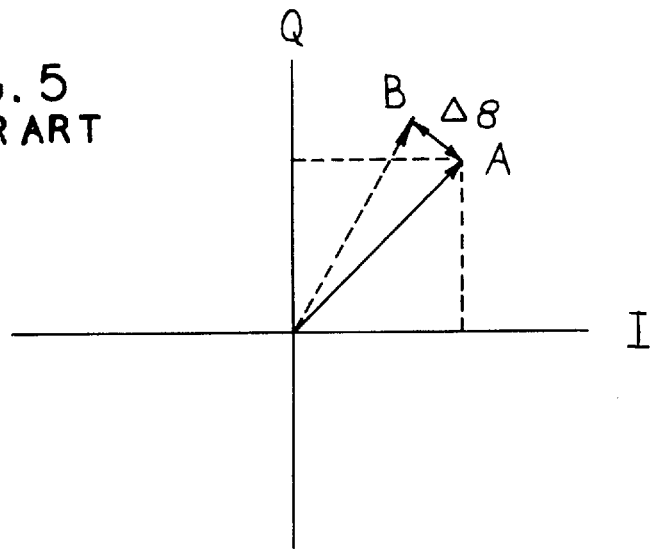
FIG. 5 is a chart for explaining a method to obtain the modulation accuracy in the conventional adjustment method of the modulation accuracy.
Figure 6:
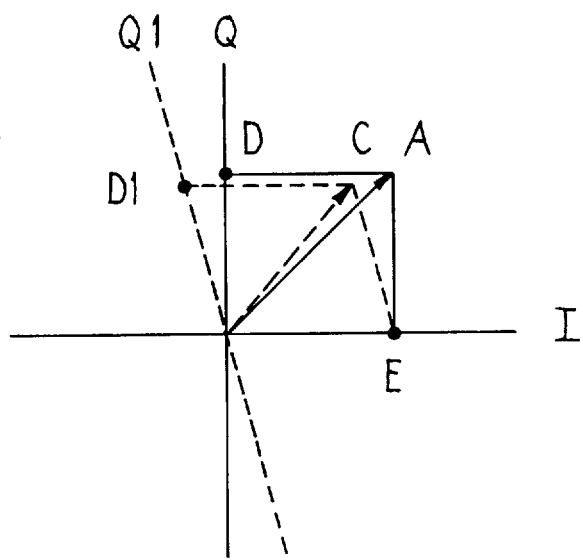
FIG. 6 is a chart for explaining an influence on the modulation accuracy when the phase difference between the I modulation signal and the Q modulation signal is not 90° in the conventional adjustment method of the modulation accuracy.

The modulator in the first embodiment shown in FIG. 1 is given the reference 10, which differs in construction from the modulator 20 in FIG. 4, however, the construction of the orthogonal modulator 11 is the same as in FIG. 4. In FIG. 1, the repeated explanation on the construction of the orthogonal modulator 11 is intended to be avoided and the construction of a phase error corrector 10A of the modulator 10 is described primarily. This orthogonal modulator 11 receives the corrected I signal 1B1 and the corrected Q signal 1C1 from the phase error corrector 10A (both described later) and the modulating local signal 1D and gives the modulation signal 1H.

The IQ converter 12 in the phase error corrector 10A receives the modulation data 1A being a digital data train consisting of the logic "1" and "0" and produces the I signal 1B and the Q signal 1C. The conversion rule from the modulation data 1A to the I signal 1B and the Q signal 1C is determined in accordance with the modulation system such as the π/4 shift QPSK and 16 QAM.

In the phase error corrector 10A of the first embodiment in FIG. 1, the I component corrector 13 and the Q component corrector 14 are arranged between the foregoing IQ converter 12 and the orthogonal modulator 11 to add a minute phase difference. The phase error correction controller 15 controls the I component corrector 13 and the Q component corrector 14 such that the minute phase error is added to the I signal 1B and the Q signal 1C to convert them into the corrected I signal 1B1 and the corrected Q signal 1C1. The corrected I signal 1B1 and the corrected Q signal 1C1 enter the multipliers 16 and 17 in the orthogonal modulator 11, respectively.

Figure 2:
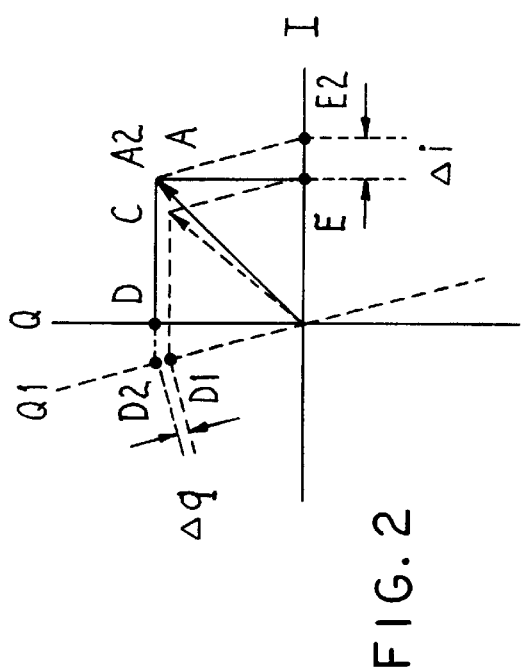
FIG. 2 is a chart for explaining the correction method of the I modulation signal and the Q modulation signal according to the invention.

Next, the I component corrector 13, the Q component corrector 14, and the phase error correction controller 15 will be described with reference to FIG. 2 for explaining a correction method to the I modulation signal and the Q modulation signal.

In order to draw an identical phase locus to that of the ideal signal on the IQ phase plane, on the Q1 axis when the I modulation signal and Q modulation signal does not have the accurate 90° phase difference, a Q component correction $\Delta q$ is added to a Q component D1 to obtain D1+$\Delta q$=D2. Also on the I axis, an I component correction $\Delta i$ is added to an I component E to obtain E+$\Delta i$=E2. The vector sum A2 of the corrected I component E2 and Q component D2 is equal to the vector sum A of the I component and the Q component having the accurate 90° phase difference therebetween.

The I component correction $\Delta i$ and the Q component correction $\Delta q$ in this case are quantitative to the 90° phase difference between the I axis and the Q axis, and the phase error correction controller 15 controls the phase error, whereby the I modulation signal and the Q modulation signal are converted into orthogonally modulated signals having the accurate 90° phase difference. Thus, the modulation signal 1H with a low error of the modulation accuracy can be obtained through the orthogonal modulator.

Next, the second embodiment of an apparatus for adjusting the modulation accuracy according to the invention will be described with reference to the block diagram in FIG. 3.

Figure 3:
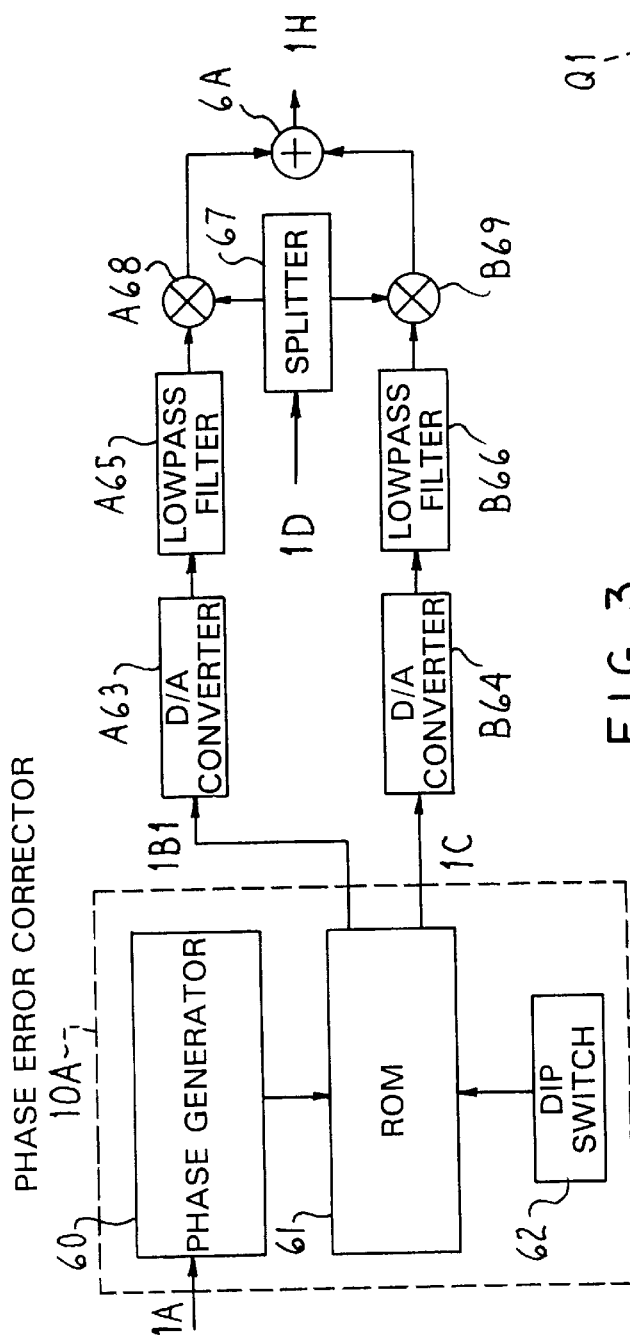
FIG. 3 is a block diagram showing a construction of a second embodiment of an apparatus for adjusting the modulation accuracy according to the invention.

A phase generator 60 and a ROM 61 in FIG. 3 constitute the same part as the IQ converter 12, I component corrector 13, and Q component corrector 14 in the phase error corrector 10A in FIG. 1.

The phase generator 60 receives the same modulation data 1A as described in the foregoing first embodiment. When receiving the modulation data 1A, the phase generator 60 produces phase data with the phase angle of 0°, 45°, 90°, 135°, 180°, 225°, 270° and 315° in accordance with values of the modulation data 1A to give them to the ROM 61.

The ROM 61 stores therein in advance values in which the I component correction $\Delta i$ and the Q component correction $\Delta q$ quantitative to the 90° phase difference between the I modulation signal 1E and the Q modulation signal 1F are added to the data of the I signal 1B and the Q signal 1C in correspondence with the phase data of the modulation data 1A, the bit train of the modulation data received in the past, and the time data between data symbols.

The readout control of the foregoing data stored in the ROM 61 is done by a dip switch 62, which is equivalent in function to the phase error correction controller 15 in the first embodiment.

The corrected I signal 1B1 and the corrected Q signal 1C1 each enter a digital to analog (hereunder, referred to as D/A) converter A63 and a D/A converter B64.

Output signals from the D/A converter A63 and the D/A converter B64 each enter a lowpass filter A65 and a lowpass filter B66, respectively.

Output signals from the lowpass filter A65 and the lowpass filter B66 each enter a double balanced mixer A68 and a double balanced mixer B69, respectively.

Further, the modulating local signal 1D enters a splitter 67, in which the modulating local signal 1D is split into two signals, the phases of which are shifted by (+) 45° and (−) 45°. The splitter 67 constitutes the phase converter 18 in the first embodiment.

Each of the two signals with the phase shifted by (+) 45° and (−) 45° from the modulating local signal 1D enters the foregoing double balanced mixer A68 and the double balanced mixer B69, respectively.

Output signals from the double balanced mixer A68 and the double balanced mixer B69 are sent out to a combiner 6A, and the combiner 6A supplies the modulation signal 1H.

Thus, the D/A converter A63, lowpass filter A65, and double balanced mixer A68 constitute the multiplier 16 in the first embodiment.

In the same manner, the D/A converter B64, lowpass filter B66, and double balanced mixer B69 constitute the multiplier 17 in the first embodiment.

The combiner 6A is equivalent to the adder 19 in the first embodiment. The double balanced mixer A68, double balanced mixer B69, splitter 67, and combiner 6A constitute the orthogonal modulator 11 in the first embodiment.

Next, the operation of the second embodiment will be described, using the π/4 shift QPSK modulation system by way of example.

When the modulation data 1A consisting of the digital signals of the logic "1" and "0" enters the phase generator 60, the phase generator 60 produces phase data with the phase angle of 0°, 45°, 90°, 135°, 180°, 225°, 270°, and 315° in accordance with the data of the modulation data 1A.

In the ROM 61 are written in advance values in which the I component correction $\Delta i$ and the Q component correction $\Delta q$ quantitative to the 90° phase difference between the I modulation signal and the Q modulation signal are added to the data of the I signal 1B and the Q signal 1C in correspondence with the phase data of the input data, the bit train of the input data in the past, and the time data between data symbols.

Setting N bits for the address of the ROM 61 by the dip switch 62 can vary the phase difference. Entering the output of the foregoing phase generator 60 into the ROM 61 as the address data of the ROM 61 will produce the phase corrected I signal and Q signal, namely, the corrected I signal 1B1 and the corrected Q signal 1C1, which go out of data terminals of the ROM 61 to enter the D/A converter A63 and the D/A converter B64.

Thus, the ROM 61 can produce the same corrected I signal 1B1 and corrected Q signal 1C1 as the I component corrector 13 and the Q component corrector 14 in the foregoing first embodiment to correct a phase difference between the I signal 1B and the Q signal 1C from the IQ converter 12 to produce the corrected I signal 1B1 and the corrected Q signal 1C1.

These circuits of the phase generator 60, ROM 61, and dip switch 62 can be formed of a ROM and dip switch, which are commonly used and available at a low cost, and do not require any special hardware.

The modulation accuracy is adjusted such that, while varying settings of the dip switch 62, the modulation accuracy of the modulation signal 1H from the modulator 10 is measured and the setting of the dip switch is determined when the optimum modulation accuracy is given. Applying this method of adjusting the modulation accuracy to an apparatus for adjusting the modulation accuracy can adjust the modulation accuracy of the modulator 10 digitally and easily.

The data coming out of the ROM 61 are converted into analog signals in the D/A converter A63 and the D/A converter B64 and are smoothed in the subsequent lowpass filter A65 and lowpass filter B66, which enter IF inputs of the double balanced mixer A68 and the double balanced mixer B69 to be multiplied by each of the local signals.

Each of the local signal inputs at the balanced mixers receives a signal in which the splitter 67 shifts the phase of the modulating local signal 1D by (+) 45° and a signal in which the splitter 67 shifts the phase by (−) 45°, respectively. Accordingly, the phase difference between the two local signals at the balanced mixer A68 and the balanced mixer B69 becomes 90°.

Further, the output signals from RF terminals of the double balanced mixer A68 and the double balanced mixer B69 are added by the combiner 6A to give the modulation signal 1H.

Thus, according to the second embodiment, the ROM 61 stores therein in advance values in which the I component correction $\Delta i$ and the Q component correction $\Delta q$ quantitative to the 90° phase difference between the I modulation signal and the Q modulation signal are added to the data of the I signal and the Q signal in correspondence with the phase data of the input data, the bit train of the input data in the past, and the time data between data symbols, and the phase difference can be set by the dip switch 62 and the output of the phase generator 60 can be received by the ROM 61 as the address data. Thereby, only controlling the address of the ROM 61 can correct an error from the 90° phase difference between the I modulation signal and the Q modulation signal without requiring special hardware, thus enhancing the modulation accuracy of the digital modulator.

Thus, according to the method of adjusting the modulation accuracy of the invention, the I component correction $\Delta i$ and the Q component correction $\Delta q$ to a plurality of phase differences are set in advance and the I component correction $\Delta i$ and the Q component correction $\Delta q$ are added to the I signal and the Q signal converted from the modulation data, respectively. Therefore, the accurate 90° phase difference between the I modulation signal and the Q modulation signal can be obtained easily without using special hardware.

Further, according to the apparatus of adjusting the modulation accuracy of the invention, the phase error correction controller in the phase error corrector adds the I component correction $\Delta i$ and the Q component correction $\Delta q$ of minute errors from the 90° of a plurality of phase differences between the I signal and the Q signal converted from the modulation data to the I signal and the Q signal, respectively. Therefore, the accurate 90° phase difference can be secured between the I modulation signal and the Q modulation signal without using special hardware, and with a simple construction.

What is claimed is:

1. An apparatus for adjusting modulation accuracy, comprising:

a phase error corrector in which an I component correction $\Delta i$ and a Q component correction $\Delta q$ of a minute phase difference are set in advance for a plurality of phase differences, the I component correction $\Delta i$ and the Q component correction $\Delta q$ being added to an I signal and a Q signal converted from modulation data, respectively, by a phase error correction controller to produce a corrected I signal and a corrected Q signal; and an orthogonal modulator in which the corrected I signal is multiplied by a modulating local signal to produce an I modulation signal, the corrected Q signal is multiplied by a signal made by shifting the phase of the modulating local signal by 90° to produce a Q modulation signal, and the I modulation signal and the Q modulation signal are added to produce a modulation signal.

2. An apparatus for adjusting modulation accuracy as claimed in claim 1, wherein the phase error corrector comprises:

an IQ converter for converting the modulation data into the I signal and the Q signal;

an I component corrector in which the I component correction Δi is added by the phase error correction controller to give the corrected I signal; and a Q component corrector in which the Q component correction Δq is added by the phase error correction controller to give the corrected Q signal.

3. An apparatus for adjusting modulation accuracy as claimed in claim 1, wherein the phase error corrector comprises:

a ROM in which are written in advance values made by adding the I component correction Δi and the Q component correction Δq quantitative to the 90° phase difference between the I modulation signal and the Q modulation signal to data of the I signal and the Q signal in correspondence with phase data of the modulation data, bit trains of the modulation data in the past, and time data between data symbols.

4. An apparatus for adjusting modulation accuracy as claimed in claim 1, wherein the phase error correction controller is a dip switch.

5. An apparatus for adjusting modulation accuracy as claimed in claim 1, wherein the orthogonal modulator comprises:

a first multiplier for multiplying the corrected I signal by the modulating local signal to produce the I modulation signal;

a second multiplier for multiplying the corrected Q signal by a phase conversion signal made by shifting the phase of the modulating local signal by 90° to produce the Q modulation signal; and an adder for adding the I modulation signal and the Q modulation signal to produce the modulation signal.

6. An apparatus for adjusting modulation accuracy as claimed in claim 3, wherein the orthogonal modulator comprises:

a first digital to analog converter for converting the corrected I signal supplied from the ROM into an analog signal;

a first lowpass filter for smoothing an output from the first digital to analog converter;

a second digital to analog converter for converting the corrected Q signal supplied from the ROM into an analog signal;

a second lowpass filter for smoothing an output from the second digital to analog converter;

a splitter for splitting a modulating local signal into a signal with a phase shifted by (+) 45° and a signal with a phase shifted by (−) 45°;

a first double balanced mixer for multiplying an output from the first lowpass filter by an output from the splitter with a phase shifted by (+) 45° from a phase of the modulating local signal;

a second double balanced mixer for multiplying an output from the second lowpass filter by an output from the splitter with a phase shifted by (−) 45° from a phase of the modulating local signal; and a combiner for adding an output from the first double balanced mixer and an output from the second double balanced mixer to produce a modulation signal.

7. An apparatus for adjusting modulation accuracy as claimed in claim 3, wherein the phase error corrector comprises a phase generator for generating phase data of 0°, 45°, 90°, 135°, 180°, 225°, 270°, and 315°, in accordance with the modulation data.

8. A method of adjusting modulation accuracy including the steps of:

converting digital modulation data to generate an I modulation signal and a Q modulation signal;

setting in advance an I component correction Δi for a plurality of phase differences in accordance with the I signal;

setting in advance a Q component correction Δq for the plurality of phase differences in accordance the Q signal;

preselecting an I component correction Δi and a Q component correction Δq to correct a phase difference between the I modulation signal and the Q modulation signal in an orthogonal modulator; and adding the I component correction Δi to the I signal to produce a corrected I signal, and adding the Q component correction Δq to the Q signal to produce a corrected Q signal.

9. A method according to claim 8, including the steps of:

multiplying the corrected I signal by a modulating local signal to produce an I modulation signal;

shifting the phase of the modulating local signal by 90 degrees to produce a second modulating local signal;

multiplying the corrected Q signal by the second modulating local signal to produce a Q modulation signal; and adding the I modulation signal and the Q modulation signal to produce a modulation signal.

10. An apparatus for adjusting modulation accuracy for a modulation signal formed by modulation data, comprising:

a phase error corrector in which are stored in advance values made by adding an I component correction Δi and a Q component correction Δq quantitative to a 90 degree phase difference between an I modulation signal and a Q modulation signal to data of an I signal and a Q signal in correspondence with phase data of the modulation data, bit trains of the modulation data in the past, and time data between data symbols, the phase error corrector outputting a corrected I signal from adding the I component correction Δi and the I signal, and outputting a corrected Q signal from adding the Q component correction Δq and the Q signal; and an orthogonal modulator in which the corrected I signal is multiplied by a modulating local signal to produce an I modulation signal, the corrected Q signal is multiplied by a signal made by shifting the phase of the modulating local signal by 90 degrees to produce a Q modulation signal, and the I modulation signal and the Q modulation signal are added to produce a modulation signal.

11. An apparatus for adjusting modulation accuracy as in claim 10, the phase error corrector comprising:

an IQ converter for converting the modulation data into the I signal and the Q signal;

an I component corrector in which the I component correction Δi is added by a the phase error correction controller to give the corrected I signal; and a Q component corrector in which the Q component correction Δq is added by the phase error correction controller to give the corrected Q signal.

12. An apparatus for adjusting modulation accuracy as in claim 10, the phase error corrector comprising a ROM storing the values in advance.

13. An apparatus for adjusting modulation accuracy as in claim 12, the phase error corrector comprising a dip switch connected to the ROM.

14. An apparatus as in claim 10, the phase error corrector including a dip switch.

15. An apparatus for adjusting modulation accuracy as in claim 10 wherein the phase error corrector comprises:

a phase generator for generating phase data of 0°, 45°, 90°, 135°, 180°, 225°, 270°, and 315° in accordance with the modulation data; and a ROM storing the values in advance of use of the apparatus.

* * * * *

UNITED STATES PATENT AND TRADEMARK OFFICE
CERTIFICATE OF CORRECTION

PATENT NO. : 5 886 584
DATED : March 23, 1999
INVENTOR(S) : Masaharu TANAI et al It is certified that error appears in the above-identified patent and that said Letters Patent is hereby corrected as shown below:

Column 8, line 66; delete "the".

Signed and Sealed this

Seventeenth Day of August, 1999

Attest:

Q. TODD DICKINSON

Attesting Officer

Acting Commissioner of Patents and Trademarks